United States Patent
Chandramouli et al.

(10) Patent No.: US 12,317,077 B2
(45) Date of Patent: May 27, 2025

(54) COMMUNICATION SYSTEM

(71) Applicant: NOKIA SOLUTIONS AND NETWORKS OY, Espoo (FI)

(72) Inventors: Devaki Chandramouli, Plano, TX (US); Nagendra S Bykampadi, Bangalore (IN); Thomas Theimer, Baierbrunn (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 1146 days.

(21) Appl. No.: 17/254,497

(22) PCT Filed: Jun. 25, 2019

(86) PCT No.: PCT/EP2019/066789
§ 371 (c)(1),
(2) Date: Dec. 21, 2020

(87) PCT Pub. No.: WO2020/002306
PCT Pub. Date: Jan. 2, 2020

(65) Prior Publication Data
US 2021/0127265 A1    Apr. 29, 2021

(30) Foreign Application Priority Data
Jun. 26, 2018   (IN) .............. 201811023719

(51) Int. Cl.
*H04W 12/06*    (2021.01)
*H04L 67/51*    (2022.01)
*H04W 12/08*    (2021.01)

(52) U.S. Cl.
CPC ........... *H04W 12/068* (2021.01); *H04L 67/51* (2022.05); *H04W 12/08* (2013.01)

(58) Field of Classification Search
CPC ...... H04W 12/068; H04W 12/08; H04L 67/51
USPC .......................................................... 726/6
See application file for complete search history.

(56) References Cited

U.S. PATENT DOCUMENTS

| | | | | |
|---|---|---|---|---|
| 6,023,762 A | * | 2/2000 | Dean | G06F 21/34 713/168 |
| 8,842,815 B2 | * | 9/2014 | Connelly | H04L 65/1036 379/219 |
| 9,036,603 B2 | * | 5/2015 | Johnsson | H04W 24/02 370/329 |
| 9,755,941 B2 | * | 9/2017 | Ameixieira | H04L 5/0032 |
| 10,116,488 B2 | * | 10/2018 | Zaccaria | G05B 19/0428 |

(Continued)

FOREIGN PATENT DOCUMENTS

CN       109 639 829 A       4/2019

OTHER PUBLICATIONS

Communication pursuant to Article 94(3) EPC dated Jul. 25, 2023, corresponding to European Patent Application No. 19736611.5.
(Continued)

*Primary Examiner* — Samson B Lemma
(74) *Attorney, Agent, or Firm* — SQUIRE PATTON BOGGS (US) LLP

(57) ABSTRACT

There is provided an apparatus comprising means for: receiving, from a requesting service and/or from a network function, an indication of security credentials for a selected service agent; and transmitting the security credentials to the selected service agent as part of a service request from the requesting service.

14 Claims, 12 Drawing Sheets

901 - receive, from a requesting service associated with the requesting service agent and/or from a network function, an indication of security credentials for a set of selected service agents.

902 - transmit the security credentials to the selected service agent as part of a service request from the requesting service

(56) References Cited

U.S. PATENT DOCUMENTS

| | | | | |
|---|---|---|---|---|
| 10,397,278 | B2* | 8/2019 | Gummaraju | H04L 63/0876 |
| 10,849,186 | B2* | 11/2020 | Dao | H04L 65/80 |
| 2016/0308838 | A1* | 10/2016 | Murphy | H04L 12/04 |
| 2018/0007178 | A1* | 1/2018 | Subhraveti | G06F 9/541 |
| 2018/0034858 | A1* | 2/2018 | Gummaraju | H04L 63/08 |
| 2018/0159717 | A1 | 6/2018 | Cormie et al. | |

OTHER PUBLICATIONS

Communication under Rule 71(3) EPC dated Apr. 26, 2024 corresponding to European Patent Application No. 19736611.5.

International Search Report and Written Opinion dated Sep. 26, 2019 corresponding to International Patent Application No. PCT/EP2019/066789.

3GPP TR 23.742 V0.2.0 (Jun. 2018), Technical Report, 3rd Generation Partnership Project; Technical Specification Group Services and System Aspects; Study on Enhancements to the Service-Based Architecture (Release 16), Jun. 10, 2018, XP051451682.

3GPP TS 23.502 V15.2.0 (Jun. 2018), Technical Specification, 3rd Generation Partnership Project; Technical Specification Group Services and System Aspects; Procedures for the 5G System; Stage 2 (Release 15), Jun. 19, 2018, XP051472861.

3GPP TS 33.501 V15.1.0 (Jun. 2018), Technical Specification, 3rd Generation Partnership Project; Technical Specification Group Services and System Aspects; Security architecture and procedures for 5G system (Release 15), Jun. 21, 2018, XP051473075.

Nokia et al: "Solution 6: Service Framekwork update," 3GPP Draft; S2-188706, SA WG2 Meeting #128, Vilnius, Lithuania, Aug. 26, 2018, XP051537530.

Office Action dated Jul. 4, 2022, corresponding to Indian Patent Application No. 201811023719.

Communication pursuant to Article 94(3) EPC dated Aug. 25, 2022, corresponding to European Patent Application No. 19736611.5.

\* cited by examiner

COMMUNICATION SYSTEM

FIELD

The present application relates to a method, apparatus, and computer program.

BACKGROUND

A communication system can be seen as a facility that enables communication sessions between two or more entities such as user terminals, base stations/access points and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to a first aspect, there is provided an apparatus comprising means for: receiving, from a requesting service and/or from a network function, an indication of security credentials for a selected service agent; and transmitting the security credentials to the selected service agent as part of a service request from the requesting service.

The apparatus may comprise means for: receiving a discovery request from the requesting service; forwarding the received discovery request to the network function; receiving, from the network function, identities of a plurality of service agents and/or a plurality of service instances that may fulfil the service request; and transmitting the received identities to the requesting service. The apparatus may comprise means for: receiving, from the network function, additional information for selecting a single service agent from the plurality of service agents and/or receiving additional information for selecting a single service instance from the plurality of service instances; and transmitting the additional information to the requesting service. The apparatus may comprise means for: receiving, from the network function, security credentials that authorise access to at least two of the plurality of service agents and/or to each of the plurality of service instances; and transmitting the security credentials to the requesting service. The security credentials may comprise respective security credentials for each of the plurality of service agents and/or each of the plurality of service instances.

The apparatus may comprise means for: receiving, from the selected service agent, a response indicating a service instance to be used for performing the requested service; and forwarding the received response to the requesting service.

The security credential may identify the selected service agent.

The security credentials may identify a particular service instance associated with the selected service agent.

According to a second aspect, there is provided an apparatus comprising means for: receiving, from a requesting service agent associated with a requesting service, a request for a service; selecting a service instance for providing a service to the requesting service from a plurality of service instances; and forwarding the request to the selected service instance.

The apparatus may comprise means for: receiving, in the request for a service, security credentials; verifying the security credentials; and performing the selecting and forwarding when the security credentials are successfully verified. The security credentials may identify the apparatus. The selecting may comprise performing load balancing resulting from the received request for a service.

The apparatus may comprise means for sending, to the requesting service, an indication of the selected service instance. The security credentials may identify a particular service instance.

The apparatus may comprise means for: monitoring at least one signalling flow received for the selected service instance for deviations from an expected signalling flow; and inhibiting the transmission of communications of the at least one signalling flow to the selected service when the deviation is more than a threshold amount. The signalling flows may be encrypted on a transport layer.

According to a third aspect, there is provided a system comprising: an apparatus according to any of the first aspect; a requesting service configured to transmit the service request to the apparatus according to any of the first aspect; an apparatus as claimed in any of the second aspect configured to act as the selected service agent; and a plurality of service instances.

According to a fourth aspect, there is provided an apparatus comprising means for: receiving a discovery request from a requesting service; forwarding the received discovery request to a network function; receiving, from the network function, identities of a plurality of service agents and/or a plurality of service instances that may fulfil a service request; and transmitting the received identities to the requesting service.

The apparatus may comprise means for: receiving, from the network function, additional information for selecting a single service agent from the plurality of service agents and/or receiving additional information for selecting a single service instance from the plurality of service instances; and transmitting the additional information to the requesting service.

The apparatus may comprise means for: receiving, from the network function, security credentials that authorise access to at least two of the plurality of service agents and/or to each of the plurality of service instances; and transmitting the security credentials to the requesting service. The security credentials may comprise respective security credentials for each of the plurality of service agents and/or each of the plurality of service instances.

According to a fifth aspect, there is provided an apparatus comprising means for: receiving, from a service agent associated with the apparatus, an indication of identities of a plurality of service agents that may fulfil a service request of the apparatus; selecting a single service agent from the plurality of service agents; and transmitting an indication of the identity of the single service agent to the selected service agent.

The apparatus may comprise means for transmitting the indication via the service agent associated with the apparatus.

According to a sixth aspect, there is provided an apparatus comprising means for: receiving a discovery request from a service agent associated with a requesting service; and transmitting, to the requesting service agent, identities of a plurality of service agents and/or identities of a plurality of service instances that may fulfil a service request of the requesting service.

According to a seventh aspect, there is provided a method comprising receiving, from a requesting service and/or from a network function, an indication of security credentials for a selected service agent; and transmitting the security credentials to the selected service agent as part of a service request from the requesting service.

The method may comprise: receiving a discovery request from the requesting service; forwarding the received discovery request to the network function; receiving, from the network function, identities of a plurality of service agents and/or a plurality of service instances that may fulfil the service request; and transmitting the received identities to the requesting service. The method may comprise: receiving, from the network function, additional information for selecting a single service agent from the plurality of service agents and/or receiving additional information for selecting a single service instance from the plurality of service instances; and transmitting the additional information to the requesting service. The method may comprise: receiving, from the network function, security credentials that authorise access to at least two of the plurality of service agents and/or to each of the plurality of service instances; and transmitting the security credentials to the requesting service. The security credentials may comprise respective security credentials for each of the plurality of service agents and/or each of the plurality of service instances.

The method may comprise: receiving, from the selected service agent, a response indicating a service instance to be used for performing the requested service; and forwarding the received response to the requesting service.

The security credential may identify the selected service agent.

The security credentials may identify a particular service instance associated with the selected service agent.

According to an eighth aspect, there is provided a method comprising: receiving, from a requesting service agent associated with a requesting service, a request for a service; selecting a service instance for providing a service to the requesting service from a plurality of service instances; and forwarding the request to the selected service instance.

The method may comprise: receiving, in the request for a service, security credentials; verifying the security credentials; and performing the selecting and forwarding when the security credentials are successfully verified. The security credentials may identify an apparatus performing the method. The selecting may comprise performing load balancing resulting from the received request for a service.

The method may comprise sending, to the requesting service, an indication of the selected service instance. The security credentials may identify a particular service instance.

The method may comprise: monitoring at least one signalling flow received for the selected service instance for deviations from an expected signalling flow; and inhibiting the transmission of communications of the at least one signalling flow to the selected service when the deviation is more than a threshold amount. The signalling flows may be encrypted on a transport layer.

According to a ninth aspect, there is provided a method comprising: receiving, by a first service agent, from a requesting service and/or from a network function, an indication of security credentials for a second service agent; transmitting, by the first service agent, the security credentials to the second service agent as part of a service request from the requesting service; verifying, by the second service agent, the security credentials; and, when the security credentials are successfully verified, selecting, by the second service agent, a service instance for providing a service to the requesting service from a plurality of service instances; and forwarding, by the second service agent the request to the selected service instance.

According to a tenth aspect, there is provided a method comprising: receiving a discovery request from a requesting service; forwarding the received discovery request to a network function; receiving, from the network function, identities of a plurality of service agents and/or a plurality of service instances that may fulfil a service request; and transmitting the received identities to the requesting service.

The method may comprise: receiving, from the network function, additional information for selecting a single service agent from the plurality of service agents and/or receiving additional information for selecting a single service instance from the plurality of service instances; and transmitting the additional information to the requesting service.

The method may comprise: receiving, from the network function, security credentials that authorise access to at least two of the plurality of service agents and/or to each of the plurality of service instances; and transmitting the security credentials to the requesting service. The security credentials may comprise respective security credentials for each of the plurality of service agents and/or each of the plurality of service instances.

According to a eleventh aspect, there is provided a method comprising: receiving, from a service agent associated with apparatus executing the method, an indication of identities of a plurality of service agents that may fulfil a service request of the apparatus; selecting a single service agent from the plurality of service agents; and transmitting an indication of the identity of the single service agent to the selected service agent.

The method may comprise transmitting the indication via the service agent associated with the apparatus.

According to a twelfth aspect, there is provided a method comprising: receiving a discovery request from a service agent associated with a requesting service; and transmitting, to the requesting service agent, identities of a plurality of service agents and/or identities of a plurality of service instances that may fulfil a service request of the requesting service.

According to a thirteenth aspect, there is provided an apparatus comprising: at least one processor; and at least one memory comprising computer code that, when executed by the at least one processor, causes the apparatus to: receive, from a requesting service and/or from a network function, an indication of security credentials for a selected service agent; and transmit the security credentials to the selected service agent as part of a service request from the requesting service.

The apparatus may further be caused to: receive a discovery request from the requesting service; forward the received discovery request to the network function; receive, from the network function, identities of a plurality of service agents and/or a plurality of service instances that may fulfil the service request; and transmit the received identities to the requesting service. The apparatus may further be caused to: receive, from the network function, additional information for selecting a single service agent from the plurality of service agents and/or receive additional information for selecting a single service instance from the plurality of service instances; and transmit the additional information to the requesting service. The apparatus may further be caused to: receive, from the network function, security credentials that authorise access to at least two of the plurality of service agents and/or to each of the plurality of service instances; and transmit the security credentials to the requesting service. The security credentials may comprise respective security credentials for each of the plurality of service agents and/or each of the plurality of service instances.

The apparatus may further be caused to: receive, from the selected service agent, a response indicating a service instance to be used for performing the requested service; and forward the received response to the requesting service.

The security credential may identify the selected service agent.

The security credentials may identify a particular service instance associated with the selected service agent.

According to a fourteenth aspect, there is provided an apparatus comprising: at least one processor; and at least one memory comprising computer code that, when executed by the at least one processor, causes the apparatus to: receive, from a requesting service agent associated with a requesting service, a request for a service; select a service instance for providing a service to the requesting service from a plurality of service instances; and forward the request to the selected service instance.

The apparatus may further be caused to: receive, in the request for a service, security credentials; verify the security credentials; and perform the selecting and forwarding when the security credentials are successfully verified. The security credentials may identify the apparatus. The selecting may comprise performing load balancing resulting from the received request for a service.

The apparatus may further be caused to send, to the requesting service, an indication of the selected service instance. The security credentials may identify a particular service instance.

The apparatus may further be caused to: monitor at least one signalling flow received for the selected service instance for deviations from an expected signalling flow; and inhibit the transmission of communications of the at least one signalling flow to the selected service when the deviation is more than a threshold amount. The signalling flows may be encrypted on a transport layer.

According to a fifteenth aspect, there is provided a system comprising: an apparatus according to any of the thirteenth aspect; a requesting service configured to transmit the service request to the apparatus according to any of the thirteenth aspect; an apparatus as claimed in any of the fourteenth aspect configured to act as the selected service agent; and a plurality of service instances.

According to a sixteenth aspect, there is provided an apparatus comprising: at least one processor; and at least one memory comprising computer code that, when executed by the at least one processor, causes the apparatus to: receive a discovery request from a requesting service; forward the received discovery request to a network function; receive, from the network function, identities of a plurality of service agents and/or a plurality of service instances that may fulfil a service request; and transmit the received identities to the requesting service.

The apparatus may further be caused to: receive, from the network function, additional information for selecting a single service agent from the plurality of service agents and/or receive additional information for selecting a single service instance from the plurality of service instances; and transmit the additional information to the requesting service.

The apparatus may further be caused to: receive, from the network function, security credentials that authorise access to at least two of the plurality of service agents and/or to each of the plurality of service instances; and transmit the security credentials to the requesting service. The security credentials may comprise respective security credentials for each of the plurality of service agents and/or each of the plurality of service instances.

According to a seventeenth aspect, there is provided an apparatus comprising: at least one processor; and at least one memory comprising computer code that, when executed by the at least one processor, causes the apparatus to: receive, from a service agent associated with the apparatus, an indication of identities of a plurality of service agents that may fulfil a service request of the apparatus; select a single service agent from the plurality of service agents; and transmit an indication of the identity of the single service agent to the selected service agent.

The apparatus may further be caused to transmit the indication via the service agent associated with the apparatus.

According to an eighteenth aspect, there is provided an apparatus comprising: at least one processor; and at least one memory comprising computer code that, when executed by the at least one processor, causes the apparatus to: receive a discovery request from a service agent associated with a requesting service; and transmit, to the requesting service agent, identities of a plurality of service agents and/or identities of a plurality of service instances that may fulfil a service request of the requesting service.

According to a nineteenth aspect, there is provided a computer program comprising instructions [or a computer readable medium comprising program instructions] for causing an apparatus to perform at least the following: receiving, from a requesting service and/or from a network function, an indication of security credentials for a selected service agent; and transmitting the security credentials to the selected service agent as part of a service request from the requesting service.

The apparatus may further be caused to perform: receiving a discovery request from the requesting service; forwarding the received discovery request to the network function; receiving, from the network function, identities of a plurality of service agents and/or a plurality of service instances that may fulfil the service request; and transmitting the received identities to the requesting service. The apparatus may further be caused to perform: receiving, from the network function, additional information for selecting a single service agent from the plurality of service agents and/or receiving additional information for selecting a single service instance from the plurality of service instances; and transmitting the additional information to the requesting service. The apparatus may further be caused to perform: receiving, from the network function, security credentials that authorise access to at least two of the plurality of service agents and/or to each of the plurality of service instances; and transmitting the security credentials to the requesting service. The security credentials may comprise respective security credentials for each of the plurality of service agents and/or each of the plurality of service instances.

The apparatus may further be caused to perform: receiving, from the selected service agent, a response indicating a service instance to be used for performing the requested service; and forwarding the received response to the requesting service.

The security credential may identify the selected service agent.

The security credentials may identify a particular service instance associated with the selected service agent.

According to an twentieth aspect, there is provided a computer program comprising instructions [or a computer readable medium comprising program instructions] for causing an apparatus to perform at least the following: receiving, from a requesting service agent associated with a requesting service, a request for a service; selecting a service instance for providing a service to the requesting service from a plurality of service instances; and forwarding the request to the selected service instance.

The apparatus may further be caused to perform receiving, in the request for a service, security credentials; verifying the security credentials; and performing the selecting and forwarding when the security credentials are successfully verified. The security credentials may identify the apparatus. The selecting may comprise performing load balancing resulting from the received request for a service.

The apparatus may further be caused to perform sending, to the requesting service, an indication of the selected service instance. The security credentials may identify a particular service instance.

The apparatus may further be caused to perform: monitoring at least one signalling flow received for the selected service instance for deviations from an expected signalling flow; and inhibiting the transmission of communications of the at least one signalling flow to the selected service when the deviation is more than a threshold amount. The signalling flows may be encrypted on a transport layer.

According to a twenty first aspect, there is provided a computer program comprising instructions [or a computer readable medium comprising program instructions] for causing an apparatus to perform at least the following: receiving, by a first service agent, from a requesting service and/or from a network function, an indication of security credentials for a second service agent; transmitting, by the first service agent, the security credentials to the second service agent as part of a service request from the requesting service; verifying, by the second service agent, the security credentials; and, when the security credentials are successfully verified, selecting, by the second service agent, a service instance for providing a service to the requesting service from a plurality of service instances; and forwarding, by the second service agent the request to the selected service instance.

According to a twenty second aspect, there is provided a computer program comprising instructions [or a computer readable medium comprising program instructions] for causing an apparatus to perform at least the following:: receiving a discovery request from a requesting service; forwarding the received discovery request to a network function; receiving, from the network function, identities of a plurality of service agents and/or a plurality of service instances that may fulfil a service request; and transmitting the received identities to the requesting service.

The apparatus may further be caused to perform: receiving, from the network function, additional information for selecting a single service agent from the plurality of service agents and/or receiving additional information for selecting a single service instance from the plurality of service instances; and transmitting the additional information to the requesting service.

The apparatus may further be caused to perform: receiving, from the network function, security credentials that authorise access to at least two of the plurality of service agents and/or to each of the plurality of service instances; and transmitting the security credentials to the requesting service. The security credentials may comprise respective security credentials for each of the plurality of service agents and/or each of the plurality of service instances.

According to a twenty third aspect, there is provided a computer program comprising instructions [or a computer readable medium comprising program instructions] for causing an apparatus to perform at least the following: receiving, from a service agent associated with the apparatus, an indication of identities of a plurality of service agents that may fulfil a service request of the apparatus; selecting a single service agent from the plurality of service agents; and transmitting an indication of the identity of the single service agent to the selected service agent.

The apparatus may further be caused to perform: transmitting the indication via the service agent associated with the apparatus.

According to a twenty fourth aspect, there is provided a computer program comprising instructions [or a computer readable medium comprising program instructions] for causing an apparatus to perform at least the following: receiving a discovery request from a service agent associated with a requesting service; and transmitting, to the requesting service agent, identities of a plurality of service agents and/or identities of a plurality of service instances that may fulfil a service request of the requesting service.

According to a twenty fifth aspect, there is provided non-transitory computer readable medium comprising program instructions for causing an apparatus to perform at least the following: receiving, from a requesting service and/or from a network function, an indication of security credentials for a selected service agent; and transmitting the security credentials to the selected service agent as part of a service request from the requesting service.

The apparatus may further be caused to perform: receiving a discovery request from the requesting service; forwarding the received discovery request to the network function; receiving, from the network function, identities of a plurality of service agents and/or a plurality of service instances that may fulfil the service request; and transmitting the received identities to the requesting service. The apparatus may further be caused to perform: receiving, from the network function, additional information for selecting a single service agent from the plurality of service agents and/or receiving additional information for selecting a single service instance from the plurality of service instances; and transmitting the additional information to the requesting service. The apparatus may further be caused to perform: receiving, from the network function, security credentials that authorise access to at least two of the plurality of service agents and/or to each of the plurality of service instances; and transmitting the security credentials to the requesting service. The security credentials may comprise respective security credentials for each of the plurality of service agents and/or each of the plurality of service instances.

The apparatus may further be caused to perform: receiving, from the selected service agent, a response indicating a service instance to be used for performing the requested service; and forwarding the received response to the requesting service.

The security credential may identify the selected service agent.

The security credentials may identify a particular service instance associated with the selected service agent.

According to a twenty sixth aspect, there is provided non-transitory computer readable medium comprising program instructions for causing an apparatus to perform at least the following: receiving, from a requesting service agent associated with a requesting service, a request for a service; selecting a service instance for providing a service to the requesting service from a plurality of service instances; and forwarding the request to the selected service instance.

The apparatus may further be caused to perform receiving, in the request for a service, security credentials; verifying the security credentials; and performing the selecting and forwarding when the security credentials are successfully verified. The security credentials may identify the apparatus. The selecting may comprise performing load balancing resulting from the received request for a service.

The apparatus may further be caused to perform sending, to the requesting service, an indication of the selected service instance. The security credentials may identify a particular service instance.

The apparatus may further be caused to perform: monitoring at least one signalling flow received for the selected service instance for deviations from an expected signalling flow; and inhibiting the transmission of communications of the at least one signalling flow to the selected service when the deviation is more than a threshold amount. The signalling flows may be encrypted on a transport layer.

According to a twenty seventh aspect, there is provided non-transitory computer readable medium comprising program instructions for causing an apparatus to perform at least the following: receiving, by a first service agent, from a requesting service and/or from a network function, an indication of security credentials for a second service agent; transmitting, by the first service agent, the security credentials to the second service agent as part of a service request from the requesting service; verifying, by the second service agent, the security credentials; and, when the security credentials are successfully verified, selecting, by the second service agent, a service instance for providing a service to the requesting service from a plurality of service instances; and forwarding, by the second service agent the request to the selected service instance.

According to a twenty eighth aspect, there is provided non-transitory computer readable medium comprising program instructions for causing an apparatus to perform at least the following: receiving a discovery request from a requesting service; forwarding the received discovery request to a network function; receiving, from the network function, identities of a plurality of service agents and/or a plurality of service instances that may fulfil a service request; and transmitting the received identities to the requesting service.

The apparatus may further be caused to perform: receiving, from the network function, additional information for selecting a single service agent from the plurality of service agents and/or receiving additional information for selecting a single service instance from the plurality of service instances; and transmitting the additional information to the requesting service.

The apparatus may further be caused to perform: receiving, from the network function, security credentials that authorise access to at least two of the plurality of service agents and/or to each of the plurality of service instances; and transmitting the security credentials to the requesting service. The security credentials may comprise respective security credentials for each of the plurality of service agents and/or each of the plurality of service instances.

According to a twenty ninth aspect, there is provided non-transitory computer readable medium comprising program instructions for causing an apparatus to perform at least the following: receiving, from a service agent associated with the apparatus, an indication of identities of a plurality of service agents that may fulfil a service request of the apparatus; selecting a single service agent from the plurality of service agents; and transmitting an indication of the identity of the single service agent to the selected service agent.

The apparatus may further be caused to perform: transmitting the indication via the service agent associated with the apparatus.

According to a thirtieth aspect, there is provided non-transitory computer readable medium comprising program instructions for causing an apparatus to perform at least the following: receiving a discovery request from a service agent associated with a requesting service; and transmitting, to the requesting service agent, identities of a plurality of service agents and/or identities of a plurality of service instances that may fulfil a service request of the requesting service.

According to a thirty first aspect, there is provided an apparatus comprising: receiving circuitry configured to receive, from a requesting service and/or from a network function, an indication of security credentials for a selected service agent; and transmitting circuitry for transmitting the security credentials to the selected service agent as part of a service request from the requesting service.

The apparatus may comprise: receiving circuitry configured to receive a discovery request from the requesting service; forwarding circuitry configured to forward the received discovery request to the network function; receiving circuitry configured to receive, from the network function, identities of a plurality of service agents and/or a plurality of service instances that may fulfil the service request; and transmitting circuitry configured to transmit the received identities to the requesting service. The apparatus may comprise: receiving circuitry configured to receive, from the network function, additional information for selecting a single service agent from the plurality of service agents and/or receive additional information for selecting a single service instance from the plurality of service instances; and transmitting circuitry configured to transmit the additional information to the requesting service. The apparatus may comprise: receiving circuitry configured to receive, from the network function, security credentials that authorise access to at least two of the plurality of service agents and/or to each of the plurality of service instances; and transmitting circuitry configured to transmit the security credentials to the requesting service. The security credentials may comprise respective security credentials for each of the plurality of service agents and/or each of the plurality of service instances.

The apparatus may comprise: receiving circuitry configured to receive, from the selected service agent, a response indicating a service instance to be used for performing the requested service; and forwarding circuitry configured to forward the received response to the requesting service.

The security credential may identify the selected service agent.

The security credentials may identify a particular service instance associated with the selected service agent.

According to a thirty second aspect, there is provided an apparatus comprising: receiving circuitry configured to receive, from a requesting service agent associated with a requesting service, a request for a service; selecting circuitry configured to select a service instance for providing a service to the requesting service from a plurality of service instances; and forwarding circuitry configured to forward the request to the selected service instance.

The apparatus may comprise: receiving circuitry configured to receive, in the request for a service, security credentials; verifying circuitry configured to verify the security credentials; and circuitry configured to perform the selecting and forwarding when the security credentials are successfully verified. The security credentials may identify the apparatus. The selecting may comprise performing load balancing resulting from the received request for a service.

The apparatus may comprise sending circuitry for sending, to the requesting service, an indication of the selected service instance. The security credentials may identify a particular service instance.

The apparatus may comprise: monitoring circuitry configured to monitor at least one signalling flow received for the selected service instance for deviations from an expected signalling flow; and inhibiting circuitry configured to inhibit the transmission of communications of the at least one signalling flow to the selected service when the deviation is more than a threshold amount. The signalling flows may be encrypted on a transport layer.

According to a thirty third aspect, there is provided a system comprising: an apparatus according to any of the thirty first aspect; a requesting service configured to transmit the service request to the apparatus according to any of the thirty first aspect; an apparatus as claimed in any of the thirty second aspect configured to act as the selected service agent; and a plurality of service instances.

According to a thirty fourth aspect, there is provided an apparatus comprising: receiving circuitry configured to receive a discovery request from a requesting service; forwarding the received discovery request to a network function; receiving circuitry configured to receive, from the network function, identities of a plurality of service agents and/or a plurality of service instances that may fulfil a service request; and transmitting circuitry configured to transmit the received identities to the requesting service.

The apparatus may comprise: receiving circuitry configured to receive, from the network function, additional information for selecting a single service agent from the plurality of service agents and/or receive additional information for selecting a single service instance from the plurality of service instances; and transmitting circuitry configured to transmit the additional information to the requesting service.

The apparatus may comprise: receiving circuitry configured to receive, from the network function, security credentials that authorise access to at least two of the plurality of service agents and/or to each of the plurality of service instances; and transmitting circuitry configured to transmit the security credentials to the requesting service. The security credentials may comprise respective security credentials for each of the plurality of service agents and/or each of the plurality of service instances.

According to a thirty fifth aspect, there is provided an apparatus comprising: receiving circuitry configured to receive, from a service agent associated with the apparatus, an indication of identities of a plurality of service agents that may fulfil a service request of the apparatus; selecting circuitry configured to select a single service agent from the plurality of service agents; and transmitting circuitry configured to transmit an indication of the identity of the single service agent to the selected service agent.

The apparatus may comprise transmitting circuitry configured to transmit the indication via the service agent associated with the apparatus.

According to a thirty sixth aspect, there is provided an apparatus comprising: receiving circuitry configured to receive a discovery request from a service agent associated with a requesting service; and transmitting circuitry configured to transmit, to the requesting service agent, identities of a plurality of service agents and/or identities of a plurality of service instances that may fulfil a service request of the requesting service.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

DESCRIPTION OF FIGURES

Embodiments will now be described, by way of example only, with reference to the accompanying Figures in which.

DETAILED DESCRIPTION

In general, the following disclosure relates to an example architecture, with associated apparatus, for a communication system. In particular, the following relates to an architecture and associated apparatus for a distributed services environment.

Distributed services environments are similar to client-server models in that a service function may request a particular service from another service function. In the presence case, the requested service may form part of an overall service to be provided to a user equipment. For example, the requested service may relate to the provision of subscription information that may be used by the requesting service function to set up another service for a user equipment.

The following describes examples in which, when requesting (and obtaining information for requesting) a particular service, a service function utilises a service agent (described further below) associated wherewith to perform certain functions previously performed by the service function. For example, there may be a client service agent (also referred to as a consumer service agent) associated with the client/requesting-side service function, and there may be a server service agent (also referred to as a producer service agent) associated with the server/requested-side service function. Certain actions currently performed by the service functions may then be outsourced to the service agents. For example, discovery requests sent by the client service function may be routed through the client service agent. Further, service requests between the client and server service functions may be transmitted between their associated service agents. As will be detailed below, such a segregation of functions may result in increased security and in a more robust network architecture, particularly when service functions are provided by different vendors. Moreover, outsourcing at least some of the presently described functions may enable a more flexible network architecture.

Before explaining in detail the examples, certain general principles of a wireless communication system and mobile communication devices are briefly explained with reference to FIGS. 1 to 2 to assist in understanding the technology underlying the described examples.

Figure 1:
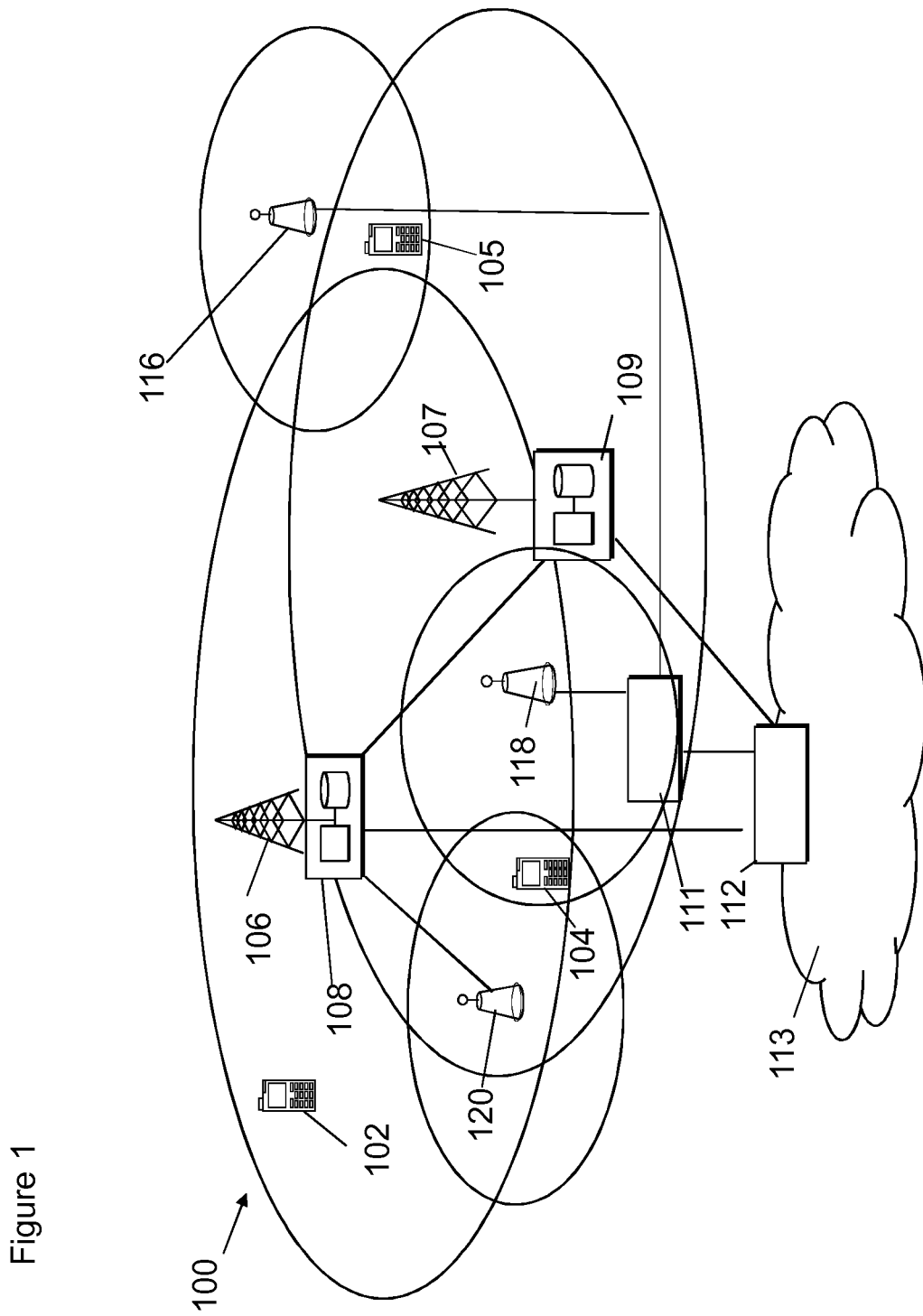
FIG. 1 shows a schematic diagram of an example communication system comprising a plurality of base stations and a plurality of communication devices.

In a wireless communication system 100, such as that shown in FIG. 1, mobile communication devices or user apparatus (UE) 102, 104, 105 are provided wireless access via at least one base station or similar wireless transmitting and/or receiving node or point. A user can access the communication system by means of an appropriate communication device or terminal. A communication device of a user is often referred to as user equipment (UE) or as a user apparatus. Throughout the following, these terms will be used interchangeably. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). An example of attempts to solve the problems associated with the increased demands for capacity is an architecture that is known as the long-term evolution (LTE) of the Universal Mobile Telecommunications System (UMTS) radio-access technology. LTE is being standardized by the 3rd Generation Partnership Project (3GPP).

A base station is referred to as an eNodeB (eNB) in LTE, and may be referred to more generally as simply a network apparatus or a network access point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each user apparatus is served by only one MME and/or S-GW at a time and the (e) NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In an LTE system, radio resource control (RRC) is defined to be a sublayer of radio interface Layer 3 that exists in the control plane only, and which provides information transfer service to the non-access stratum (see 3GPP Technical Specification Group Services and System Aspects 21.905). RRC is a protocol layer between a user apparatus and an eNB, and is in charge of, for example, paging the user apparatus when traffic comes, establishing/maintaining or release of radio bearers (establishing an RRC connection between user apparatus and eNB), user apparatus mobility, user apparatus measurement configuration and user apparatus reporting configuration, etc. RRC is responsible for controlling the configuration of radio interface Layers 1 and 2.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, base stations 116 and 118 are connected via a gateway 111 whilst station 120 connects via the controller apparatus 108. In some embodiments, the smaller stations may not be provided.

Figure 2:
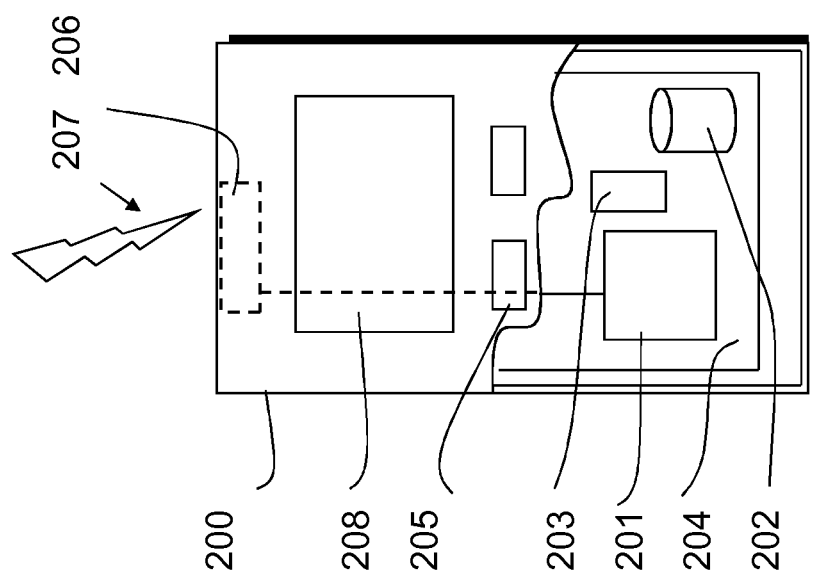
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user apparatus (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto. The communication devices 102, 104, 105 may access the communication system based on various access techniques.

An example of wireless communication systems are architectures standardized by the 3rd Generation Partnership Project (3GPP). A latest 3GPP based development is often referred to as the long term evolution (LTE) or LTE Advanced Pro of the Universal Mobile Telecommunications System (UMTS) radio-access technology. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Figure 3:
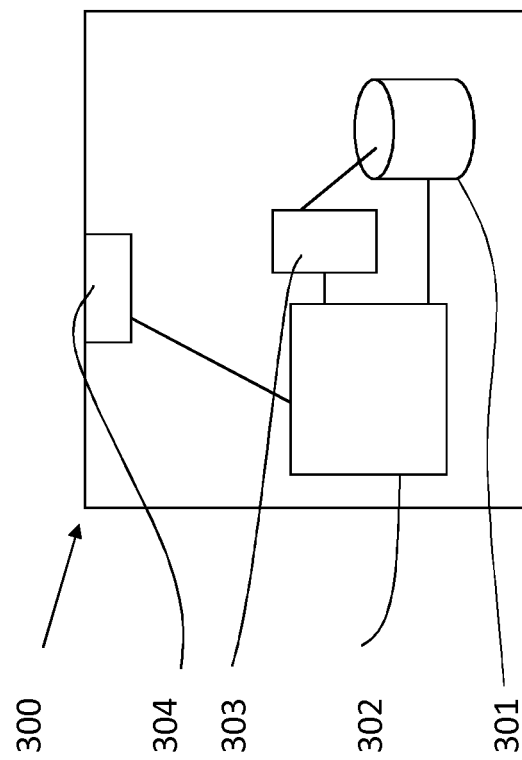
FIG. 3 shows a schematic diagram of an example network element.

An example network equipment for the 3GPP system is shown in FIG. 3. FIG. 3 shows an example of a control apparatus 300 for a communication system, for example to be coupled to and/or for controlling a station of an access system, such as a RAN node, e.g. a base station or (e) node B, or a node of a core network such as an MME. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions. Control apparatus 300 may be included in a chipset or modem apparatus. A chipset or modem apparatus which includes apparatus 300 may be included in a control node such as an eNB.

The proposed 5G system supports a service based architecture. A service based architecture utilises a service based framework for a variety of communications-related processes, such as service registration, deregistration, discovery, selection, routing, etc. A service-based architecture is characterised by, instead of having predefined interfaces between network elements, using a services model in which components query a network function repository function (NRF) to discover and communicate with each other over application programming interfaces (APIs). An API is a function and/or procedure that allows the creation of application which access the features or data of an operating system, application or other service.

To support this service architecture, there are described/provided a plurality of functional entities (also known as network functions, NFs). Aside from the above-mentioned NRF, other network functions include:

Access and mobility function (AMF): the AMF may provide features relating to UE-based authentication, authorisation and mobility management. The AMF may be independent of access technology type, and so a UE may be connected to a single AMF regardless of the access technology used;

Session Management function (SMF): the SMF may provide session management functions, including allocating Internet Protocol (IP) addresses to UEs. If a UE has multiple sessions, different SMFs may be allocated to each session to manage them individually;

Policy control function (PCF): the PCF may use information on the packet flow between two communicating entities to determine policies about mobility and session management for a given UE for the AMF and SMF to enforce this;

Unified data management function (UDM): the UDM may store subscription data for a UE;

Application function (AF): the AF may provide information on the packet flow to the PCF for supporting quality of services; and Authentication server function (AUSF): the AUSF may store data for authentication of a UE.

In Rel-15 of the 5G protocol, the 5G system is described such that the NRF supports NF/NF services management, such as for registration and discovery functionality. In other words, the NRF supports the establishment of communications between different NFs. In this 5G system, individual NFs such as AMF, SMF, PCF, UDM, AUSF, etc. perform discovery and selection themselves. Also, the NFs support direct routing functionality from one service to another.

Figure 4:
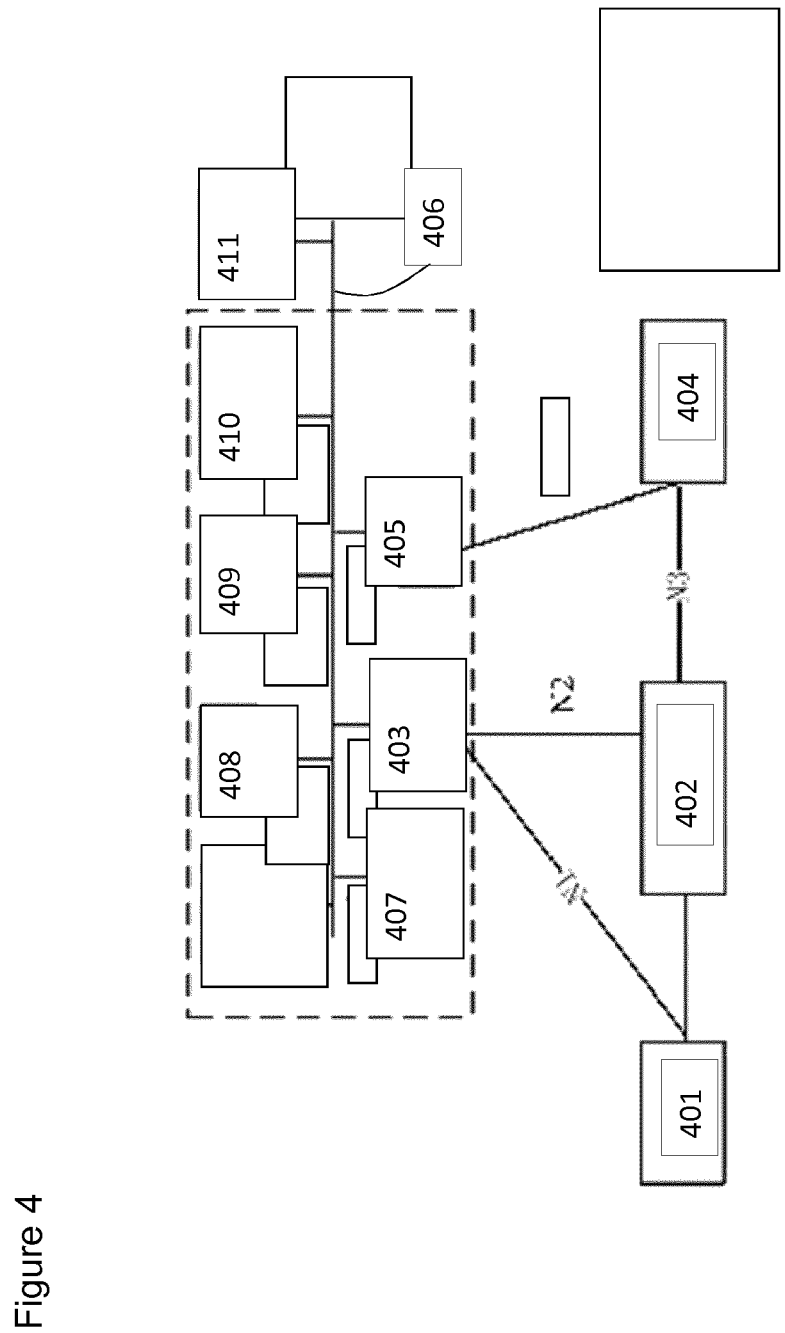
FIG. 4 shows a schematic diagram of a distributed services network.

An example architecture for such a services-based architecture is depicted in FIG. 4.

FIG. 4 shows a UE 401 that is connected to radio access network 402 and AMF 403. The radio access network 402 is also connected to the AMF 403, and is additionally connected to a user plane function UPF 404. The UPF 404 is additionally connected to SMF 405. The SMF 405 and AMF 403 are shown as being logically connected to a common logical backbone 406. Also connected to this logical backbone are the AUSF 407, NRF 408, PCF 409, UDM 410 and AF, 411.

Individual NFs can be offered by different vendors, even within the same type of NF. This means that some NF instances may belong to different vendors (e.g. 10 AMFs may be provided by vendor 1, whilst 10 AMFs may be provided by vendor 2). As these functions may be configured slightly differently, this may lead to problems when selecting a particular service instance to use for a particular service. Furthermore, such differences may give rise to load balancing issues across the network, as overload control functionality will not be uniformly implemented in the different (distributed) NF instances.

This load imbalance affects the system described in 5G rel-15, in which the NRF is configured to provide candidate NF/NF service instances to a consumer NF looking for another NF for providing a service. The consumer NF service performs the selection of a particular instance to use out of the candidate NF/NF service instances.

One mechanism for addressing this load imbalance involves the introduction of a proxy on the consumer service side that is responsible for communication between services. Such a setup may also utilise a routing control for providing a routing policy for the framework agents in order that factors such as software versions and capabilities of the service instances may be considered.

It is not clear how such mechanisms are used for selection of a service instance, routing between service instances, or both. Moreover, security aspects are not considered at all in this mechanism.

In order to address this, a system architecture is proposed in which each service is associated with a service agent. For example, a service agent being configured with consumer service instance functions, producer service instance functions and/or both consumer and producer service instance functions may be provided. In other words, the consumer and producer service functionality may be deployed and used independently. This is because the consumer and producer service functionality are logically distinct from each other. In the following, the term "producer service" will refer to a service being requested whilst the term "consumer service" will refer to a service requesting the service. The term "instance" is used to refer to a logical entity.

For clarity, the following will briefly discuss possible properties/functions of the independently configured service agents, before discussing how they may be applied in the proposed system architecture.

As discussed above, a service agent is associated with a particular type of service in a network function. The service agent may be configured such that its presence does not add any additional overhead to the actions performed by the network function. Therefore, there architecture may be set up such that no application program interface is used between the network service function and its associated service agent.

A service agent may provide a set of functionalities on behalf of its associated services in an NF. For example, a service agent may perform, on behalf of the associated services, at least one of the following procedures: registration with the NRF; service discovery with the NRF; Access Token request with the NRF; Selection of the producer Service Instance after Service discovery; Selection of the associated Service Producer based on the request from the Service consumer (taking load balancing into account); Authentication between Services Access Token verification in the target service agent for Service Access Authorization in the target Service; Secure connection with the NRF and peer service agent (e.g. TLS); and Routing of Service layer messages.

These will be discussed separately in the following.

Registration with the NRF may be performed by a service agent in response to a request from the associated NF service instance. In this case, the service agent can register the NF Instance with the NRF by executing the Registration procedure as specified in clause 4.17.1 in 3GPP TS 23.502.

When multiple service instances are behind/associated with a service agent, the service agent is registering on behalf of several service instances behind it, and so these multiple service instances may appear as a single endpoint. It is up to the service and the service agent to determine whether the service instance is exposed or only the service instance is exposed. The service agent may not forward every service instance registration to the NRF. Instead, most registrations may be handled locally by the associated service agent. Likewise, de-registration can also be handled by the service agent.

Service Discovery with the NRF may be performed when an NF consumer service requests the service agent to discover one or more NF Instances that can provide a certain service. In response to this request, the consumer service agent may perform a discovery operation (such as is described in clause 4.17.4 in TS 23.502) with the NRF in order to obtain endpoint addresses of the service agents associated the targeted (candidate) producer service instance(s) that can provide the requested NF service. These endpoint addresses may be provided to a service consumer. When endpoint addresses of the target service agents are provided to the NF consumer service, then the selected target service agent may also perform load balancing (as described further below). In another case, the requesting service agent may provide the NF consumer service with endpoint addresses for the candidate producer service instance(s) themselves. In this case, the NF consumer service may select a producer service instance from the provided endpoint addresses. In this case, the target service agent does not perform load balancing operations, but may still act as a gate keeper for service requests to the selected producer service.

Whether the NF consumer service is provided with endpoint addresses for the target producer service or for the target service agent may depend on how the target service agent registers the target producer service with the NRF. For example, the target service agent may register producer service endpoints directly (exposing, for example, the uniform resource identifiers of the producer service endpoints themselves, and making the endpoints directly selectable). The target service agent may not register producer service endpoints directly, and instead use only its own address (thus not exposing the uniform resource identifier of the producer service endpoints themselves, but rather making the service agent directly selectable instead).

The service consumer may apply application-specific filters to further reduce the set of possible producer service agents and/or possible producer service instances. As an option, the filter and selection criteria may be passed to the consumer service agent for executing the filter operation.

Access Token request with the NRF may be performed when the NF service consumer requests the service agent to obtain an Access Token from the NRF. In response to this request, the service agent may perform an Access Token Request procedure (such as is described in TS 33.501) with the NRF to authenticate with the NRF and obtain an access token on behalf of the NF service consumer. Such a procedure may mean that a trust relationship between the NF Service Instance and the service agent is established prior to the access token being granted.

Selection of a particular producer service instance after service discovery (taking load balancing into account) may be performed by a producer service agent associated with that producer service instance. This may be performed when the service discovery procedure with the NRF results in multiple producer service instances or multiple indicated producer service agent instances that can provide the desired service. In response to the multiple indicated producer NF instances or multiple indicated producer service agent instances, the service consumer may select a service agent for a service producer considering application specific filters (such as, for example, locality, the subscriber permanent identity (SUPI), the subscription concealed identifier (SUCI), Routing IDs (in the case of UDM), etc.). Then the producer service agent may select an NF Instance based on number of factors including current load on the producer service instance(s). Information relating to the factors may also be provided by the NRF.

Selection of one service producer from a plurality of service producers associated with a producer service agent (taking load balancing into account) may be performed when service consumer or a consumer service agent associated with the service consumer sends a service request to the service agent associated with the service producer for obtaining a service. In this case, the target/producer service agent performs load balancing and selects one of its own service instances to process the service request Authentication between services may be performed when mutual authentication between two network functions should be established before any interaction can take place between them. In this case, the service agents associated with the respective network functions handle authentication related functionality on behalf of the network functions or service instances. Mutual authentication may be performed using any of a variety of different authentication techniques, such as the use of public key infrastructure certificates based transport layer security. Credential verification may also be performed by the service agent(s).

Access Token verification in the target service agent for service access authorization in the target service instance relates to a check, by the producer service agent, of whether the NF Consumer Service is permitted to access the requested NF Producer Service for consuming the requested service. In this case, the producer service agent may execute an Access Token verification procedure, such as the one specified in 3GPP TS 33.501. This may result in the producer service agent interacting with the issuing NRF in order to verify the Access Token. If the verification, is successful the service agent forwards the incoming API request to the concerned NF Service within a Network Function.

Secure connection with the NRF and peer service agent (e.g. transport layer security) relates to establishing a secure connection with the peer service agent. This may be performed using, for example, one of the allowed mechanisms for establishing a secure connection described in 3GPP TS 33.501.

Routing of service layer messages is performed when a service agent is responsible for the reliable delivery of requests to the target service instance. In this case, all communication aspects, including populating the relevant fields in the service agent to service agent service layer protocol (such as HTTP), may be performed by a service agent.

The exact set of functionalities enabled depends on how the service agent is deployed in the network.

The above described mechanisms result in several different logical interfaces between different functional entities, such as a service agent to service (service agent to S) interface, a service agent to service agent (service agent to service agent) interface, and a service agent to NRF (service agent to NRF) interface.

In addition to introducing service agents, the described architecture is arranged such that the NRF may still implement the registry, authorisation and discovery functions specified in communication protocols (such as rel-15). The consumer service agent may be configured by the service consumer itself (or may be configured in a client service consumer at a next hop) and may register with the NRF. The producer service agent may be configured by the producer service itself and may also register to the NRF on behalf of the related producer instances.

Figure 5:
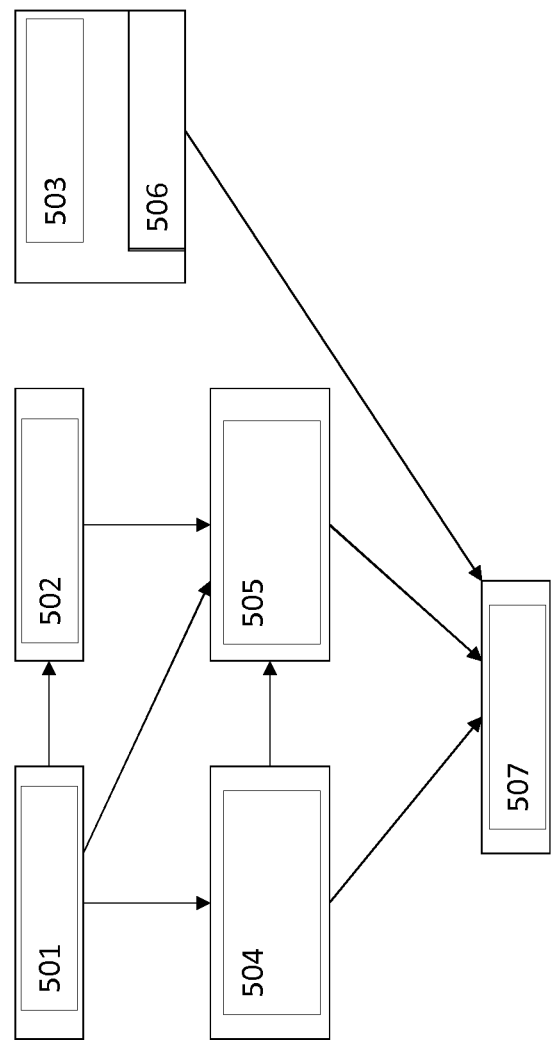
FIGS. 5 and 6 show schematic diagrams of example network architecture.

An architecture that may be used to support the above-described mechanisms is shown in FIG. 5.

In FIG. 5, there is shown a service 501, a service 502 and a service 503. Also shown are service agents 504, 505 and 506 and NRF 507. Service agents 504 and 505 are external to services 501, 502 and 503, whilst service agent 506 is external to services 501 and 502 but internal to service 503. This may be the case, for example, when service agents 504 and 505 are considered as being configured by a "next hop" network function whilst service agent 506 is configured by service 503 itself.

Service 501 is shown as being able to communicate with any of service agents 504 and 505, and with service 502. Service 502 is shown as being able to communicate with service agent 505 and service 501. Service 503 is shown as communicating with service agent 506. Each of the service agents may communicate with the NRF (for example, for activating the NRF registration and/or discovery functions). Service agents 504 and 505 are also shown as being able to communicate between each other.

As discussed above, the functions of the service agent in relation to each of the consumer and the producer side may be split up. This means that, although there may be examples in which consumer and producer service agents are collocated, that there may be examples in which they are not. Moreover, such an approach of segregating the functionalities of the consumer and producer side service agents allows for different numbers of the different types of service agents to be deployed in the network (i.e. an m*n cardinality between consumer and producer service instances may be provided).

Figure 6:
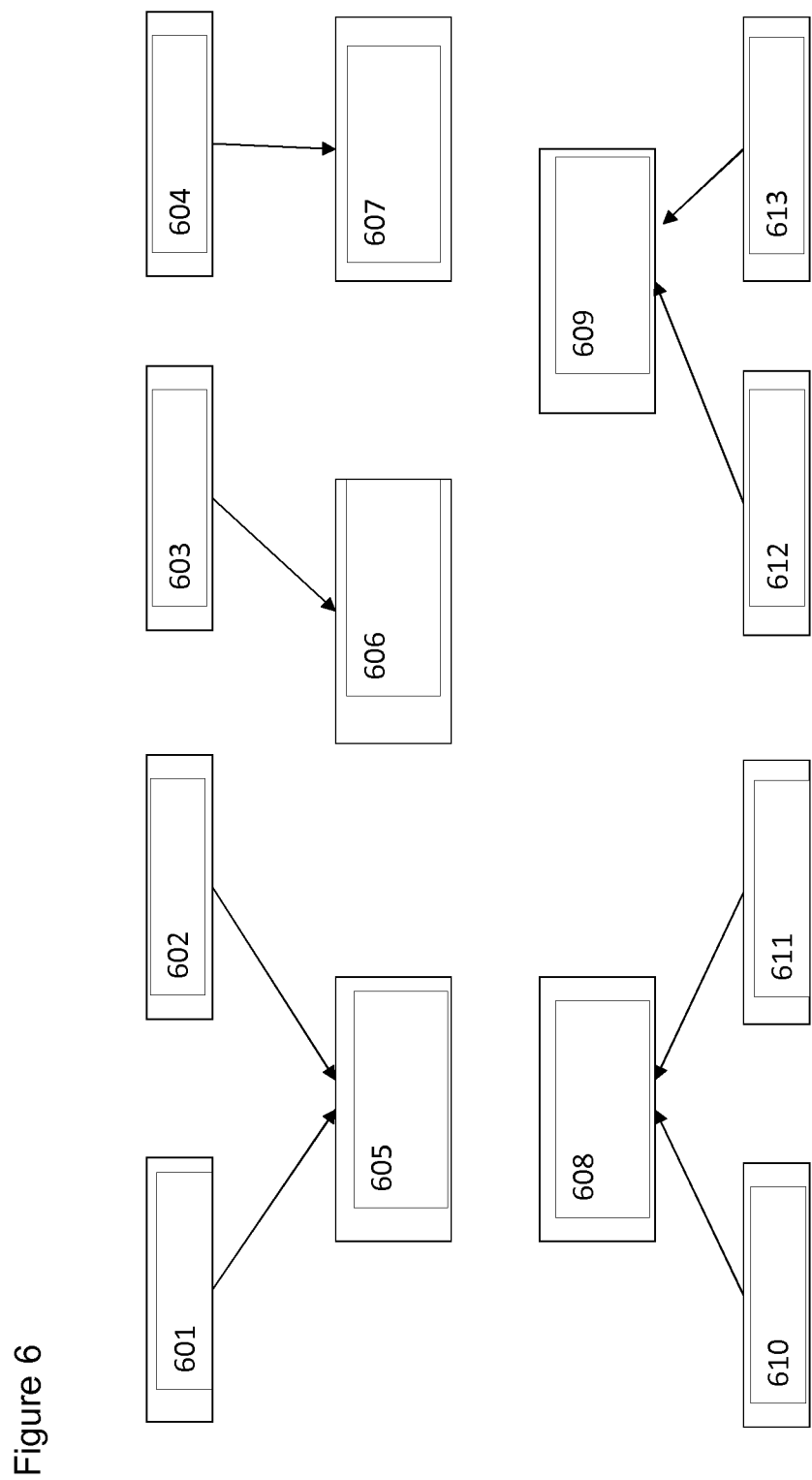

Another example architecture, when considering producer and consumer service instances and differing numbers thereof in a network, is shown in FIG. 6.

In FIG. 6, there is provided consumer services 601-604, consumer service agents 605-607, producer service agents 608-609 and provider services 610 to 613.

Consumer services 601 and 602 are both shown as communicating with consumer service agent 605. Consumer service 603 is shown as communicating with consumer service agent 606. Consumer service 604 is shown as communicating with consumer service agent 607. Producer services 610 and 611 are both shown as communicating with producer service agent 608. Producer services 612 and 613 are both shown as communicating with producer service agent 609.

Now will be described some of the functions that may be performed by each of the consumer and producer functional elements when selecting a service.

The process of selecting a specific service producer instance has two primary parts.

In a first part, a consumer application/service defines a set of matching criteria that the producer service needs to meet. An NRF may provide the consumer application/service with a list of possible candidates (possible producer services) for providing a service. The list may have been formed using a generic filter criteria (i.e. a set of criteria that does not correspond to the set of matching criteria defined by the consumer service). The consumer service applies the defined set of matching criteria to the received lists in order to select a set of producer instances for a given request. For example in rel-15, an AMF may select a UDM based on Group ID, locality, etc., and the SMF may select a UPF based on latency and locality. The end result of this is in rel-15 as a set of identical service producer instances that all meet the defined criteria. Consequently, one of these instances needs to be selected from the end result, which forms the second part.

For the second part, the system considers the selection of a particular instance from the set of identical producer service instances as a load balancing problem. As such, the current load, performance, response time, availability status, etc. of each of the set of identical producer instances should be determined. This is easier to determine at the producer side, and so a producer service agent is introduced into the present architecture. This service agent may also serve as a gate keeper for the producer service instances, protecting them from signalling storms and other threats that may overload the network/producer resources.

Thus an overall mechanism that may be performed by the described network is as follows.

First, a service consumer routes a discovery request to an NRF via a service consumer agent. The discovery request requests a list of service providers for a particular service. The IP address of the service consumer agent may be locally configured, or it may be discovered via a direct communication to the NRF.

Second, the service agent of the service consumer may communicate with the NRF to perform discovery of these services.

Third, the NRF returns a list of service agents for candidate service producer instances to the service agent of the service consumer. The NRF may additionally provide locality and other 3GPP specific/application related information regarding the service producer instances themselves. This additional information may be used by the service consumer to facilitate the selection procedure.

Fourth, the consumer service agent may obtain, from the NRF, security credentials (such as OAuth 2.0 access tokens) for providing access to any of the producer service agents associated with the candidate producer services.

Fifth, the consumer service agent forwards the list (including any additional information provided by the NRF for selection) to the consumer service.

Sixth, the consumer service selects a single producer service agent that is appropriate for the request, considering various (e.g. communication/protocol-specified) criteria.

Seventh, the service consumer transmits a request to the selected producer service agent of the service producer. The transmitted request may comprise security credentials (such as an access token, which is used over APIs) that was received by the consumer service agent from the NRF (assuming the security credentials were also provided to the consumer service in the fifth step). Alternatively, if the request is being transmitted via the consumer service agent, the transmitted request may be modified by the consumer service agent to include these security credentials.

Finally, the producer service agent receives the request and verifies the security credentials. This is contrary to rel-15, in which a producer instance verifies the security credentials. Once verified, the producer service agent may perform select a particular service producer instance of the instances supported by the producer service agent, and forward the request to the selected service producer instance.

The above mechanism may still be applicable in the event that the consumer and producer service agents are the same.

The above described mechanism/architecture implies that certain trust relationships are established between different entities. For example, on both the producer and the consumer side, there may be a trust relationship established between the NF service instance and the service agent. Further, the service agents may be trusted to obtain and/or to verify the security credentials. Further, the service consumer may be trusted to both obtain and to present the security credentials from/to the applicable service agents.

A potential signalling procedure between different elements of the above described architecture is now described with reference to FIG. 7.

Figure 7:
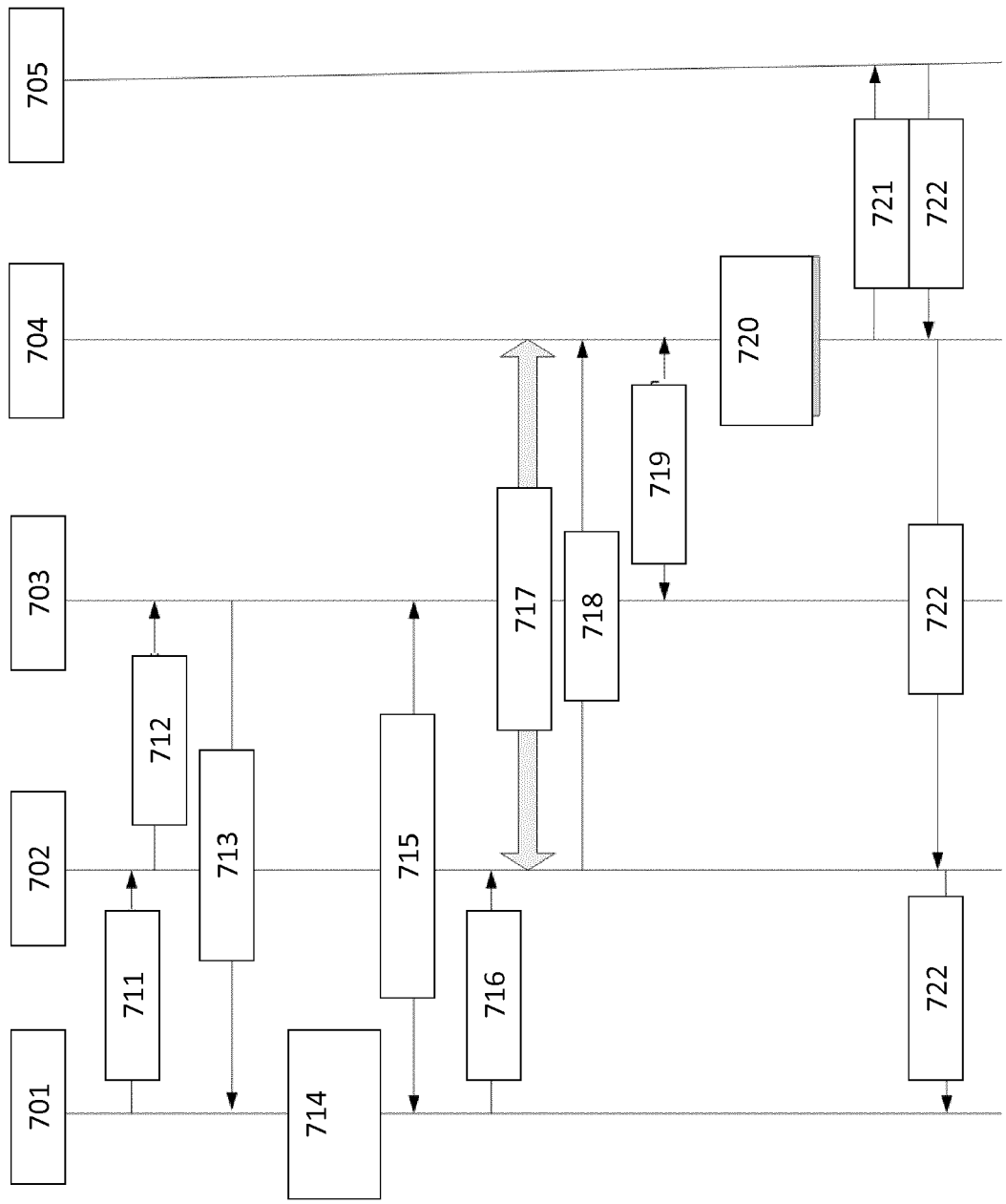
FIG. 7 shows an example signalling diagram.

FIG. 7 shows a consumer service 701, a consumer service agent 702, an NRF 703, a producer service agent 704 and a service producer instance 705.

At 711, the service consumer 701 transmits a discovery request to the consumer service agent 702. The consumer service agent 702 is associated with the NF service consumer 701. As mentioned above, the IP address for the consumer service agent 702 may be either configured locally in the service consumer itself, or leant from executing a discovery procedure (not shown). Example discovery procedures include sending the NRF 703 a query to discover at least one suitable service agent, and/or utilising a domain name system (DNS) lookup procedure.

At 712, the consumer service agent transmits the received discovery request to the NRF 703. This transmission may be made over a mutually authenticated secure connection.

At 713, in response to the received discovery request, the NRF 703 returns a discovery response to the service consumer 701. This discovery response is routed through the consumer service agent 702. The discovery response may comprise a list of producer service agents that are associated with NF instances or service instances that are suitable for the consumer service's purposes. The information provided in this response may include at least one identity for each of the producer service agents, such as a fully qualified domain name (FQDN), an internet protocol address, and/or endpoint addresses (e.g. a uniform resource identifier). The discovery response may also comprise additional information for enabling the consumer service to select a single producer service agent from the plurality indicated on the list of producer service agents. For example, locality and other 3GPP specific/application related information on the producer service instances themselves may be provided to facilitate this selection procedure. In order to form the response, the NRF may perform a series of procedures. For example, the NRF may perform authorisation check, determine the discovered NF instance(s) or NF service instance(s), and provide information of a set of target service agents that's associated with the discovered service agents. The At 714, the service consumer selects a producer service agent 704 from the list of producer service agents provided in the discovery response. The list comprises the identity of two or more producer service agents. As discussed above, the received discovery response may comprise further information that enables the service consumer to select a single producer service agent from the received plurality of producer service agent. The selection may be based on various application/3GPP specific factors, such as locality.

At 715, the service consumer retrieves security credentials (such as an access token over API) for the producer service agent 704 selected at 714 from the NRF 703. The security credentials may be such that the service consumer may obtain service from any of the Service Producer instances associated with the selected producer service instance.

At 716, the retrieved security credentials are provided by the service consumer 701 to the consumer service agent 702 as part of a service request. This service request may be made over a mutually authenticated secure connection.

At 717, the consumer service agent establishes a secure connection with the selected producer service agent 704.

At 718, the consumer service agent 702 sends the service request (including the security credentials) to the selected producer service agent 704. The service request may be an Application Program Interface (API) request). The request may be encapsulated using, for example, the hypertext transfer protocol.

At 719, the producer service agent verifies the received security credentials. In the present example, the producer service agent performs this verification by communicating with the NRF 703. It is understood that other functional entities may verify this received security credentials. For example, the producer service agent may verify the integrity of the security credentials on its own. If the integrity check is successful, the producer service agent may next verify the extent of the security credentials.

Once successfully verified, at 720 the producer service agent performs a load-balancing analysis to select a single producer service instance 705 out of a plurality of producer service instances served by the producer service agent 704 for providing the service requested at 718. If the verification is unsuccessful, the producer service agent abandons the procedure and sends a failure message back to the consumer service agent 702 (not shown).

At 721, the producer service agent 704 sends the selected producer service instance 705 the service request received at 718.

At 722, the selected producer service instance sends a response to the service request to the producer service agent 704, which forwards this response to the consumer service agent 702, which forwards this response to the service consumer 701. If the response is a positive message, the service is set up. If the response is a negative message, the procedure may begin again.

By segregating logical functions for producer and consumer services into respective agents, a number of advantages may be obtained.

For example, this segregation may effectively decouple 3gpp and application specific functionality/logic from the service framework (e.g. gate keeping, load balancing) related logic, and may unify framework related logic which is not standardized into a common function (i.e. service agent). This allows a network operator to work with a single vendor for all the framework related logic.

Further, as discussed above, having a producer service agent of the producer service instances can guard against signalling storm, which can congest and freeze up the network resources. Examples of signalling storms may result from a dysfunctional or fake consumer, Denial of service attacks, etc. The described system may thus also help to preserve a security and trust model.

Moreover, there is no need for either of the service agent and the service itself to retain the context at the end of a certain procedure Thus it helps retain the stickiness removal principle but it also hides the stickiness properties (if any) from service consumers. Further, when a request is targeted for an unavailable service instance service agent can help resolve the issue by proxying the request to another service instance that is available but has access to the same UDSF. This may help to avoid rejection with redirection specified in rel15.

Having a distributed system also enables the avoidance of having a single point of failure at the service consumer, service agent instances, and service producer instances. However, the described system also inherits the benefit of having a centralized framework by unifying the common functionality in a single NF type e.g. a producer service agent for load balancing. The service agent itself can be a single point of failure on the consumer or producer side, but there may be a plurality of service agents available that may take on the same role as a failing/failed service agent.

Further, the service agents may be configured to terminate message encryption (TLS) and thus provide access to signalling messages for monitoring and tracing purposes without the need for separate probes, which may be difficult to deploy in cloud-like systems, such as services-based architecture.

In this respect, a producer service agent may be configured to monitor at least one incoming signalling flow for a particular producer service instance. The producer service agent may determine a metric with respect to this incoming signal flow (such as a rate of transmissions per unit time). The determined metric may be compared against a threshold amount. The threshold amount may be set (e.g. by the network), or may be configurable during operation of the producer service agent in response to network conditions. If the comparison indicates that some anomalous transmissions are taking place (e.g. there is a signalling storm), the producer service agent may indicate this to another network entity that can execute actions for rectifying or mitigating this determined anomaly. Alternatively or in addition, the producer service agent may inhibit forwarding at least one transmission on the at least one incoming service flow to the particular service instance. Alternatively or in addition, the producer service agent may invoke further error handling logic, such as logging the anomalous transmissions into a file, etc. The producer service agent may perform recovery actions on detecting the anomalous transmissions. For example, the producer service agent may use its operations, administration and management (OA&M) interface to perform recovery actions once the anomaly is detected.

If the comparison does not indicate that some anomalous transmissions are taking place, then the producer service instance may continue to monitor the at least one signalling flow for the producer service instance. This technique may be applied when signalling flows are encrypted at the transport layer (e.g. using TLS techniques). These techniques may be particularly useful when the service producers are UDMs.

Thus the producer service agent may act as a simple probe to probe all kinds of messages (possible with an alert/indication being sent to another network entity, as described in the above). The producer service agent may alternatively act as a control over the signalling flow (e.g. by inhibiting the signalling flow, as per the above) with some gate keeper-like functionalities.

Figure 8:
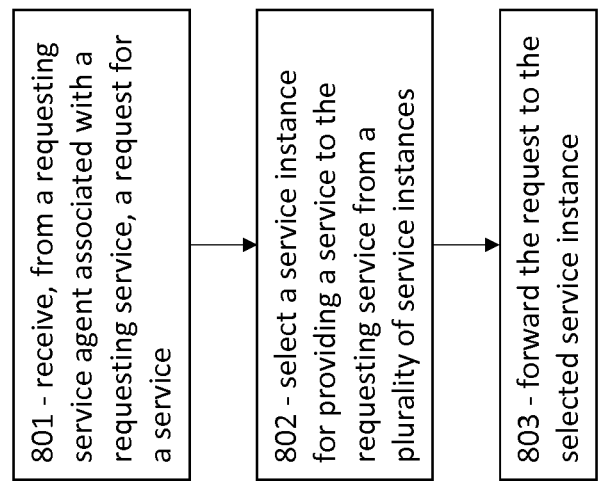
FIG. 8 shows a flow chart illustrating actions that may be performed by a producer service agent.
Figure 9:
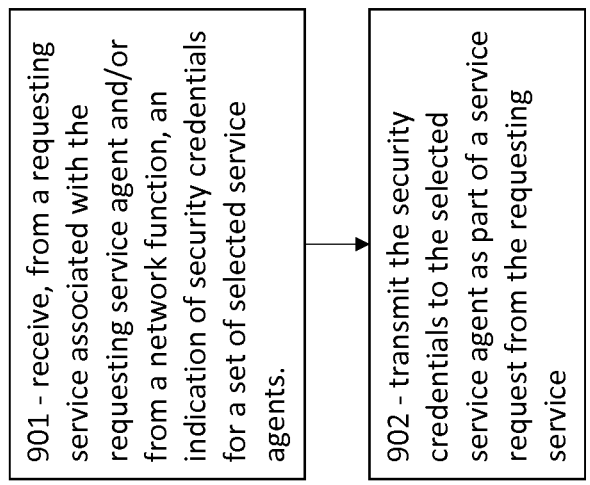
FIGS. 9 and 10 show flow charts illustrating actions that may be performed by a consumer service agent.
Figure 10:
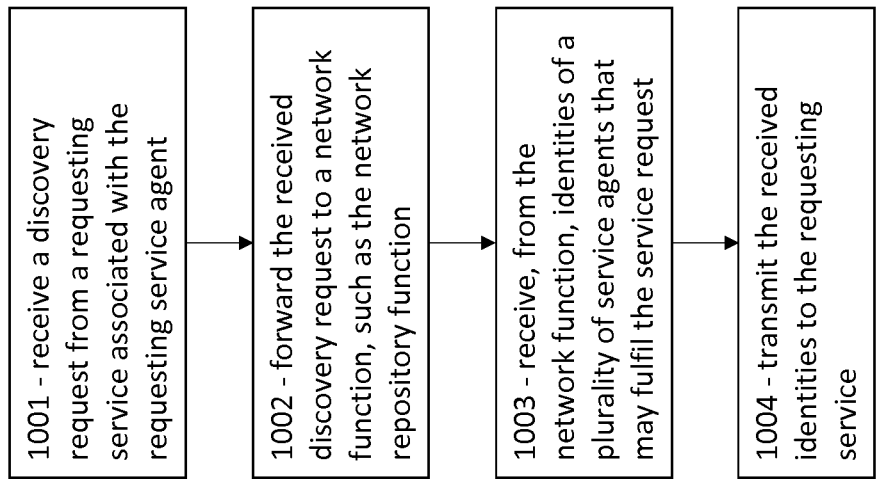

The following considers different interactions involving the service agents with reference to FIGS. 8 to 10.

FIG. 8 relates to operations performed by a producer service agent.

At 801, a producer service agent receives, from a requesting service agent associated with a requesting service, a request for a service. The request may also be received directly from the requesting service.

At 802, the producer service agent selects a service instance for providing a service to the requesting service from a plurality of service instances. The service instances may be associated with the producer service agent such that the producer service agent executes a set of logical operations on behalf of the plurality of service instances.

At 803, the producer service agent forwards the request to the selected service instance.

The request for a service may comprise security credentials, such as an access token. The security credentials may be security credentials for the producer service agent itself or for a producer service instance associated with the producer service agent. The producer service agent may determine the presence of the security credentials in the request for a service. In response to this determination, the producer service agent may verify the security credentials. The verification may be performed, at least partially, by the producer service agent itself. For example, the producer service agent may perform an integrity check on the received security credentials. The producer service agent may verify the security credentials by sending a query and/or the security credentials to another network function, such as the network repository function. When the verification is results in a positive verification, the above-mentioned selecting and forwarding of steps 802 and 803 may be performed.

The producer service agent may select a service instance for performing the requested service using load balancing considerations. In this case, the producer service agent may send, to the requesting service, an indication of the selected service instance. This indication may be sent to the requesting service directly (i.e. without involving the requesting service agent associated with the requesting service). This indication may be sent to the requesting service indirectly (i.e. via/through the requesting service agent associated with the requesting service.

Corresponding operations in relation to the requesting service agent are illustrated with respect to FIG. 9.

At 901, a requesting service agent receives, from a requesting service associated with the requesting service agent and/or from a network function, an indication of security credentials for a selected service agent. The selected service agent may be associated with a plurality of service instances that may provide a service to the requesting service. The security credentials may be used to verify that the requesting service may utilise the selected service agent itself, or the security credentials may be used to verify that the requesting service may utilise a service instance associated with the selected service agent.

At 902, the requesting service agent transmits the security credentials to the selected service agent as part of a service request from the requesting service.

The requesting service agent of any of FIG. 9 may receive, from the selected service agent, a response indicating a service instance to be used for performing the requesting service. The requesting service agent may forward the received response to the requesting service.

FIG. 10 illustrates some discovery operations that may be performed by a requesting service agent. These discovery operations may be performed by the requesting service agent of FIG. 9. These operations may be performed by a separate requesting service agent to the requesting service agent of FIG. 9.

At 1001, a requesting service agent receives a discovery request from a requesting service associated with the requesting service agent.

At 1002 the requesting service agent forwards the received discovery request to a network function, such as the network repository function.

At 1003 the requesting service agent receives, from the network function, identities of a plurality of service agents and/or a plurality of service instances that may fulfil the service request.

At 1004, the requesting service agent transmits the received identities to the requesting service.

The requesting service agent of FIG. 10 may receive, from the network function, additional information for selecting a single service agent from the plurality of service agents and/or for selecting a single service instance from the plurality of service instances. For example, the additional information may comprise respective security credentials for each of the plurality of service agents (either for the service agents themselves or for the selected service instance). The additional information may comprise locality information. The requesting service agent may transmit the additional information to the requesting service.

Figure 11:
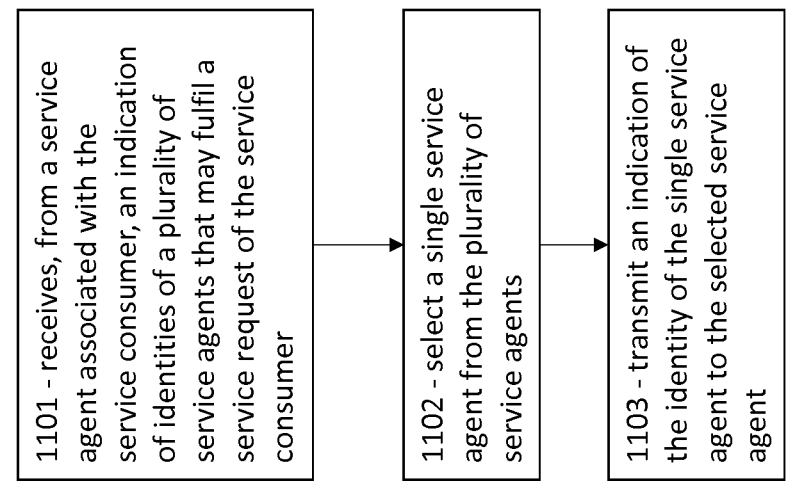
FIG. 11 shows a flow chart illustrating actions that may be performed by a service network function.

Potential actions of a service consumer are described in relation to FIG. 11.

At 1101, the service consumer receives, from a service agent associated with the service consumer, an indication of identities of a plurality of service agents that may fulfil a service request of the service consumer.

At 1102, the service consumer selects a single service agent from the plurality of service agents.

At 1103, the service consumer transmits an indication of the identity of the single service agent to the selected service agent. The indication may be transmitted to the selected service agent via the service agent associated with the service consumer.

Figure 12:
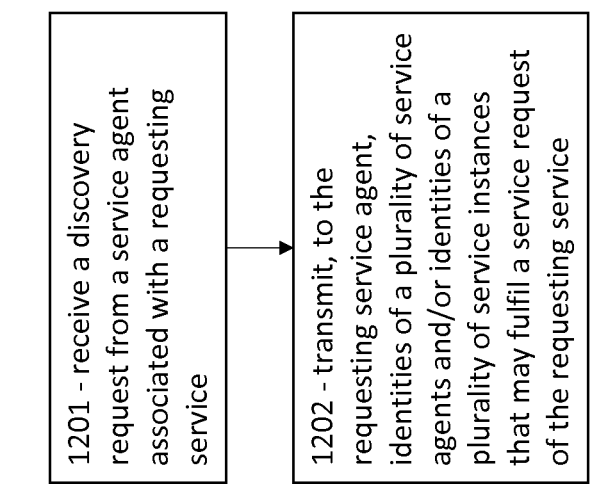
FIG. 12 shows a flow chart illustrating actions that may be performed by a network repository function.

Potential actions of an NRF are described in relation to FIG. 12.

At 1201, the NRF receives a discovery request from a service agent associated with a requesting service.

At 1202, the NRF transmits, to the requesting service agent, identities of a plurality of service agents and/or identities of a plurality of service instances that may fulfil a service request of the requesting service. The NRF may determine between transmitting identities of service agents and identifies of service instances (or combinations thereof) in dependence on the capabilities of the requesting service and/or the service agent associated with the requesting service. To this effect, requesting services/service agents thereof that cannot handle selecting between producer service agents are not provided with identities of service agents.

It should be understood that each block of the flowchart of the Figures and any combination thereof may be implemented by various means or their combinations, such as hardware, software, firmware, one or more processors and/or circuitry.

It is noted that whilst embodiments have been described in relation to one example of a standalone LTE networks, similar principles maybe applied in relation to other examples of standalone 3G, LTE or 5G networks. It should be noted that other embodiments may be based on other cellular technology other than LTE or on variants of LTE. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus, comprising:
   at least one processor; and
   at least one memory including computer program code;
      the at least one memory and the computer program code configured to, with the at least one processor, cause the apparatus to perform at least:
      receiving, from a requesting service or from a network function, an indication of security credentials for a selected service agent;
      transmitting the security credentials to the selected service agent as part of a service request from the requesting service;
      receiving, from the network function, security credentials that authorize access to at least two of the plurality of service agents or to each of the plurality of service instances; and
      transmitting the security credentials to the requesting service.

2. The apparatus as claimed in claim 1, wherein the at least one memory and the computer program code are further configured to, with the at least one processor, cause the apparatus to perform:
   receiving a discovery request from the requesting service;
   forwarding the received discovery request to the network function;
   receiving, from the network function, identities of a plurality of service agents or a plurality of service instances that may fulfil the service request; and
   transmitting the received identities to the requesting service.

3. The apparatus as claimed in claim 2, wherein the at least one memory and the computer program code are further configured to, with the at least one processor, cause the apparatus to perform:
   receiving, from the network function, additional information for selecting a single service agent from the plurality of service agents or receiving additional information for selecting a single service instance from the plurality of service instances; and
   transmitting the additional information to the requesting service.

4. The apparatus as claimed in claim 1, wherein the security credentials comprises respective security credentials for each of the plurality of service agents or each of the plurality of service instances.

5. The apparatus as claimed in claim 1, wherein the at least one memory and the computer program code are further configured to, with the at least one processor, cause the apparatus to perform:
   receiving, from the selected service agent, a response indicating a service instance to be used for performing the requested service; and
   forwarding the received response to the requesting service.

6. The apparatus as claimed in claim 1, wherein the security credential identifies the selected service agent.

7. The apparatus as claimed in claim 1, wherein the security credentials identify a particular service instance associated with the selected service agent.

8. A system, comprising:
a first apparatus and a second apparatus, each comprising the apparatus according to claim 1;
a requesting service configured to transmit the service request from the first apparatus to the second apparatus;
a third apparatus configured to act as the selected service agent, said third apparatus comprising
at least one additional processor; and
at least one additional memory including additional computer program code;
the at least one additional memory and the additional computer program code configured to, with the at least one additional processor, cause the third apparatus to perform at least:
receiving, from the requesting service agent associated with the requesting service, the request for a service;
selecting a service instance for providing a service to the requesting service from a plurality of service instances; and
forwarding the request to the selected service instance;
said system further comprising the plurality of service instances.

9. An apparatus, comprising:
at least one processor; and
at least one memory including computer program code;
the at least one memory and the computer program code configured to, with the at least one processor, cause the apparatus to perform at least
receiving a discovery request from a requesting service;
forwarding the received discovery request to a network function;
receiving, from the network function, identities of a plurality of service agents or a plurality of service instances that may fulfil a service request;
transmitting the received identities to the requesting service;
receiving, from the network function, security credentials that authorize access to at least two of the plurality of service agents or to each of the plurality of service instances; and
transmitting the security credentials to the requesting service.

10. The apparatus as claimed in claim 9, wherein the at least one memory and the computer program code are further configured to, with the at least one processor, cause the apparatus to perform:
receiving, from the network function, additional information for selecting a single service agent from the plurality of service agents or receiving additional information for selecting a single service instance from the plurality of service instances; and
transmitting the additional information to the requesting service.

11. The apparatus as claimed in claim 9, wherein the security credentials comprises respective security credentials for each of the plurality of service agents or each of the plurality of service instances.

12. A computer implemented method, using at least
at least one processor; and
at least one memory;
the method comprising:
receiving, from a requesting service or from a network function, an indication of security credentials for a selected service agent;
transmitting the security credentials to the selected service agent as part of a service request from the requesting service;
receiving, from the network function, security credentials that authorize access to at least two of the plurality of service agents or to each of the plurality of service instances; and
transmitting the security credentials to the requesting service.

13. A computer program embodied on a non-transitory computer-readable medium, said computer program comprising computer code that, when executed by at least one processor of an apparatus, causes the apparatus to perform the steps of claim 12.

14. A computer implemented method, using at least
at least one processor; and
at least one memory;
the method comprising:
receiving a discovery request from a requesting service;
forwarding the received discovery request to a network function;
receiving, from the network function, identities of a plurality of service agents or a plurality of service instances that may fulfil a service request;
transmitting the received identities to the requesting service;
receiving, from the network function, security credentials that authorize access to at least two of the plurality of service agents or to each of the plurality of service instances; and
transmitting the security credentials to the requesting service.

* * * * *